United States Patent
Youn

(10) Patent No.: US 7,325,023 B2
(45) Date of Patent: Jan. 29, 2008

(54) METHOD OF MAKING A WINDOW TYPE DECISION BASED ON MDCT DATA IN AUDIO ENCODING

(75) Inventor: Jeongnam Youn, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 476 days.

(21) Appl. No.: 10/674,616

(22) Filed: Sep. 29, 2003

(65) Prior Publication Data

US 2005/0071402 A1    Mar. 31, 2005

(51) Int. Cl.
*G06F 17/14*    (2006.01)
(52) U.S. Cl. .................................... 708/402
(58) Field of Classification Search ................ 708/402
See application file for complete search history.

(56) References Cited

U.S. PATENT DOCUMENTS

| | | | |
|---|---|---|---|
| 4,964,113 A * | 10/1990 | Geyer et al. ................. | 370/452 |
| 5,488,665 A | 1/1996 | Johnston et al. | |
| 5,497,435 A | 3/1996 | Berger | |
| 5,535,300 A | 7/1996 | Hall, II et al. | |
| 5,596,676 A * | 1/1997 | Swaminathan et al. ..... | 704/208 |
| 5,636,324 A | 6/1997 | Teh et al. | |
| 5,657,454 A | 8/1997 | Benbassat et al. | |
| 5,703,579 A | 12/1997 | Nonaka et al. | |
| 5,717,764 A | 2/1998 | Johnston et al. | |
| 5,729,556 A | 3/1998 | Benbassat et al. | |
| 5,748,763 A | 5/1998 | Rhoads | |
| 5,758,315 A | 5/1998 | Mori | |
| 5,777,812 A | 7/1998 | Kim | |
| 5,864,802 A | 1/1999 | Kim et al. | |
| 5,893,066 A | 4/1999 | Hong | |
| 5,946,652 A | 8/1999 | Heddle | |
| 5,956,674 A | 9/1999 | Smyth et al. | |
| 5,982,935 A | 11/1999 | Arbel | |
| 5,999,899 A | 12/1999 | Robinson | |
| 6,108,622 A | 8/2000 | Xue et al. | |
| 6,173,024 B1 | 1/2001 | Nanba et al. | |
| 6,282,631 B1 | 8/2001 | Arbel | |
| 6,295,009 B1 | 9/2001 | Goto | |
| 6,298,087 B1 | 10/2001 | Luna et al. | |

(Continued)

OTHER PUBLICATIONS

Danijel Domazet, Mario Kovac, "Advanced Software Implementation Of MPEG-4 AAC Audio Encoder", EC-VIP-MC, 2003, 4th EURASIP Conference focused on Video/Imaging Processing and Multimedia Communications, Jul. 2-5, 2003, Zagred, Croatia.

(Continued)

*Primary Examiner*—Tan V. Mai
(74) *Attorney, Agent, or Firm*—Blakely, Sokoloff, Taylor & Zafman LLP

(57) ABSTRACT

Preliminary Modified Discrete Cosine Transform (MDCT) coefficients are computed for a current frame of data and a next frame of data using a long window type. The computed preliminary MDCT coefficients of the current and next frames are then used to determine the window type of the current frame. If the determined window type is not the long window type, final MDCT coefficients are computed for the current frame using the determined window type.

17 Claims, 11 Drawing Sheets

U.S. PATENT DOCUMENTS

| | | |
|---|---|---|
| 6,308,150 B1 | 10/2001 | Neo et al. |
| 6,330,335 B1 | 12/2001 | Rhoads |
| 6,344,808 B1 | 2/2002 | Taruki et al. |
| 6,349,284 B1 | 2/2002 | Park et al. |
| 6,424,939 B1 | 7/2002 | Herre et al. |
| 6,456,963 B1 | 9/2002 | Araki |
| 6,484,142 B1 | 11/2002 | Miyasaka et al. |
| 6,487,535 B1 | 11/2002 | Smyth et al. |
| 6,529,604 B1 | 3/2003 | Park et al. |
| 6,542,863 B1 | 4/2003 | Surucu |
| 6,577,252 B2 | 6/2003 | Hotta |
| 6,587,057 B2 | 7/2003 | Scheuermann |
| 6,662,154 B2 | 12/2003 | Mittal et al. |
| 6,704,705 B1 | 3/2004 | Kabal et al. |
| 6,794,996 B2 | 9/2004 | Tsutsui et al. |
| 6,799,164 B1 | 9/2004 | Araki |
| 6,950,794 B1 | 9/2005 | Subramaniam et al. |
| 2003/0079222 A1 | 4/2003 | Boykin et al. |
| 2003/0083867 A1 | 5/2003 | Lopez-Estrada et al. |
| 2003/0088400 A1 | 5/2003 | Nishio et al. |
| 2003/0115052 A1 | 6/2003 | Chen et al. |
| 2003/0142746 A1 | 7/2003 | Tanaka et al. |
| 2003/0187634 A1 | 10/2003 | Li |
| 2003/0215013 A1 | 11/2003 | Budnikov |
| 2004/0088160 A1 | 5/2004 | Manu |
| 2004/0162720 A1 | 8/2004 | Jang et al. |

OTHER PUBLICATIONS

Michael J. Smithers, Matt C. Fellers, "Increased efficiency MPEG-2 AAC Encoding", Audio Engineering Safety, Convention Paper 5490, Presented at 111$^{th}$ Convention, Sep. 21-24, 2001, pp. 1-7, New York, New York, USA.

Poondikulam L.S., et al., "Efficient Implementation Of Transform Based Audio Coders Using SIMD Paradigm and Multifunction Computations", Sasken Communications Technologies, Limited, Bangalore, India, Available: http://www.sasken.com/others/wpapers/paper_0007.pdf, 5 pages.

Wang, Y., et al., "An Excitation Level Based Psychoacoustic Model For Audio Compression", Nokia Research Center, Speech and Audio Systems Lab, Tampere Finland, Downloaded May 29, 2003, Available: http://www.kom.e-technik.tu-darmstadt.de/acmmm99ep/wang.

* cited by examiner

METHOD OF MAKING A WINDOW TYPE DECISION BASED ON MDCT DATA IN AUDIO ENCODING

RELATED APPLICATIONS

This application is related to U.S. patent applications Ser. Nos. 10/674,982 and 10/674,980, both filed concurrently with the present application and assigned to the same assignees as the present application.

FIELD OF THE INVENTION

The invention relates to audio encoding in general. More particularly, the invention relates to making a window type decision in audio encoding.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2001, Sony Electronics, Inc., All Rights Reserved.

BACKGROUND OF THE INVENTION

The standardized body, Motion Picture Experts Group (MPEG), discloses conventional data compression methods in their standards such as, for example, the MPEG-2 advanced audio coding (AAC) standard (see ISO/IEC 13818-7) and the MPEG-4 AAC standard (see ISO/IEC 14496-3). These standards are collectively referred to herein as the MPEG standard.

An audio encoder defined by the MPEG standard receives an audio signal, converts it through a modified discrete cosine transform (MDCT) operation into frequency spectral data, and determines optimal scale factors for quanitizing the frequency spectral data using a rate-distortion control mechanism. The audio encoder further quantizes the frequency spectral data using the optimal scale factors, groups the resulting quantized spectral coefficients into scalefactor bands, and then subjects the grouped quantized coefficients to Huffman encoding.

According to the MPEG standard, MDCT is performed on the audio signal in such a way that that adjacent transformation ranges are overlapped by 50% along the time axis to suppress distortion developing at a boundary portion between adjacent transformation ranges. In addition, the audio signal is mapped into the frequency domain using either a long transformation range (defined by a long window) or short transformation ranges (each defined by a short window). The long window includes 2048 samples and the short window includes 256 samples. The number of MDCT coefficients generated from the long window is 1024, and the number of MDCT coefficients generated from each short window is 128. Generally, for a steady portion in which variation in signal waveform is insignificant, the long window type needs to be used. For an attack portion in which variation in signal waveform is violent, the short window type needs to be used. Which thereof is used is important. If the long window type is used for a transient signal, noise called pre-echo develops preceding an attack portion. When the short window type is used for a steady signal, suitable bit allocation is not performed due to lack of resolution in the frequency domain, the coding efficiency decreases, and noise develops, too. Such drawbacks are especially noticeable for a low-frequency sound.

According to the method proposed by the MPEG standard, the determination of the window type for a frame of spectral data begins with performing Fast Fourier Transform (FFT) on the time-domain audio data and calculating FFT coefficients. The FFT coefficients are then used to calculate the audio signal intensity for each scalefactor band within the frame. Also psychoacoustic modeling is used to determine an allowable distortion level for the frame. The allowable distortion level indicates the maximum amount of noise that can be injected into the spectral data without becoming audible. Based on the allowable distortion level and the audio signal intensity of each scalefactor band within the frame, perceptual entropy is computed. If the perceptual entropy is larger than a predetermined constant, the short window type is used for the frame. Otherwise, a long window type is used for the frame.

The above method of making a window type decision takes a large amount of computation. In addition, the resultant value of the perceptual entropy can be high if the signal strength is high whether the signal is transient or steady. That is, a frame may be assigned a short window type even if the frame is not in the transition. As discussed above, this will cause a decrease in the coding efficiency and the development of noise.

Further, if a decision is made to use a short window type, 8 successive blocks (short windows) of MDCT coefficients are generated. To reduce the amount of side information associated with short windows, the short windows may be grouped. Each group includes one or more successive short windows, the scalefactor for which is the same. However, when grouping is not performed appropriately, an increase in the number of codes or degradation of the sound quality occur. When the number of groups is too large with respect to the number of short windows, the scalefactors which otherwise can be coded in common will be coded repeatedly, and, thereby, the coding efficiency decreases. When the number of groups is too small with respect to the number of short windows, common scalefactors are used even when variation of the audio signal is violent. As a result, the sound quality is degraded. The MPEG standard does not provide any specific methods for grouping short windows.

SUMMARY OF THE INVENTION

Preliminary Modified Discrete Cosine Transform (MDCT) coefficients are computed for a current frame of data and a next frame of data using a long window type. The computed preliminary MDCT coefficients of the current and next frames are then used to determine the window type of the current frame. If the determined window type is not the long window type, final MDCT coefficients are computed for the current frame using the determined window type.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

In the following detailed description of embodiments of the invention, reference is made to the accompanying drawings in which like references indicate similar elements, and in which is shown, by way of illustration, specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
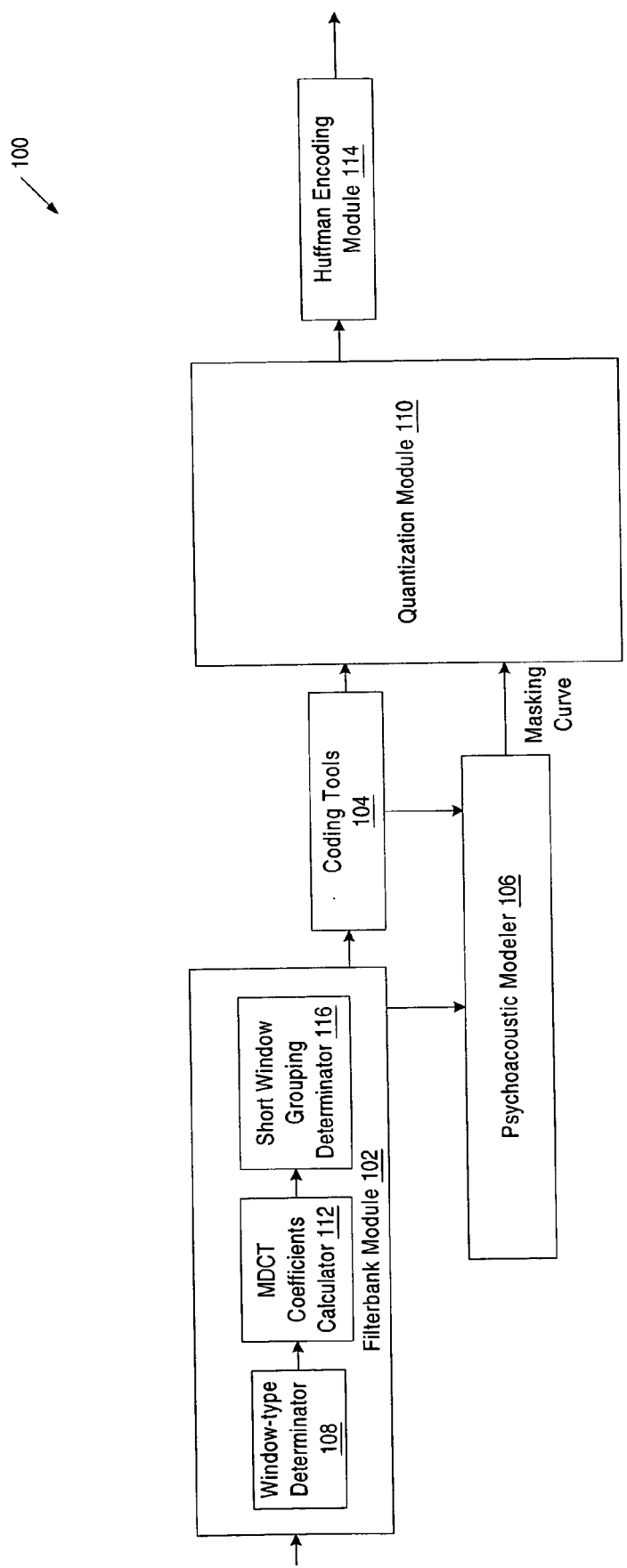
FIG. 1 is a block diagram of one embodiment of an encoding system.

Beginning with an overview of the operation of the invention, FIG. 1 illustrates one embodiment of an encoding system 100. The encoding system 100 is in compliance with MPEG audio coding standards (e.g., the MPEG-2 AAC standard, the MPEG-4 AAC standard, etc.) that are collectively referred to herein as the MPEG standard. The encoding system 100 includes a filterbank module 102, coding tools 104, a psychoacoustic modeler 106, a quantization module 110, and a Huffman encoding module 114.

The filterbank module 102 receives an audio signal and performs a modified discrete cosine transform operation (MDCT) to map the audio signal into the frequency domain. The mapping is performed using either a long transformation range (defined by a long window) in which a signal to be analyzed is expanded in time for improved frequency resolution or a short transformation range (defined by a short window) in which a signal to be analyzed is shortened in time for improved time resolution. The long window type is used in the case where there exists only a stationary signal, and the short window type is used when there is a rapid signal change. By using these two types of operation according to the characteristics of a signal to be analyzed, it is possible to prevent the generation of unpleasant noise called a pre-echo, which would otherwise result from an insufficient time resolution.

As will be discussed in more detail below, the filterbank module 102 is responsible for determining which window type to use and for generating MDCT coefficients using the determined window type. The filterbank module 102 may be also responsible, in one embodiment, for performing grouping when the short window type is used to generate MDCT coefficients. Grouping reduces the amount of side information associated with short windows. Each group includes one or more successive short windows, the scalefactor for which is the same.

The coding tools 104 include a set of optional tools for spectral processing. For example, the coding tools may include a temporal noise shaping (TNS) tool and a prediction tool to perform predictive coding, and an intensity/coupling tool and a middle side stereo (M/S) tool to perform stereophonic correlation coding.

The psychoacoustic modeler 106 analyzes the samples to determine an auditory masking curve. The auditory masking curve indicates the maximum amount of noise that can be injected into each respective sample without becoming audible. What is audible in this respect is based on psychoacoustic models of human hearing. The auditory masking curve serves as an estimate of a desired noise spectrum.

The quantization module 110 is responsible for selecting optimal scale factors for the frequency spectral data. The scale factor selection process is based on allowed distortion computed from the masking curve and the allowable number of bits calculated from the bit rate specified upon encoding. Once the optimal scale factors are selected, the quantization module 110 uses them to quantize the frequency spectral data. The resulting quantized spectral coefficients are grouped into scalefactor bands (SFBs). Each SFB includes coefficients that resulted from the use of the same scale factor.

The Huffman encoding module 114 is responsible for selecting an optimal Huffman codebook for each group of quantized spectral coefficients and performing the Huffman-encoding operation using the optimal Huffman codebook. The resulting variable length code (VLC), data identifying the codebook used in the encoding, the scale factors selected by the quantization module 110, and some other information are subsequently assembled into a bit stream.

In one embodiment, the filterbank module 102 includes a window type determinator 108, an MDCT coefficient calculator 112, and a short window grouping determinator 116. The window type determinator 108 is responsible for determining a window type to be used for the MDCT operation. In one embodiment, the determination is made using a window type decision method favoring the use of long windows, as will be discussed in more detail below.

The MDCT coefficients calculator 112 is responsible for computing MDCT coefficients using the determined window type. In one embodiment, the MDCT coefficients calculator 112 first computes preliminary MDCT coefficients using an assumed long window type. Then, if the window type determinator 108 determines that the window type to be used is not a long window type, the MDCT coefficients calculator 112 recomputes the MDCT coefficients using the determined window type. Otherwise, the preliminary MDCT coefficients do not need to be recomputed.

The short window grouping determinator 116 operates when the short window type is used and is responsible for defining how to group the short windows. In one embodiment, the short window grouping determinator 116 performs a preliminary grouping of the short windows into two groups based on energy associated with each short window. If any of the two preliminary groups is too large, the large group is further partitioned into two or more groups, as will be discussed in more detail below.

FIGS. 2-9 are flow diagrams of processes that may be performed by a filterbank module 102 of FIG. 1, according to various embodiments of the present invention. The process may be performed by processing logic that may comprise hardware (e.g., circuitry, dedicated logic, etc.), software (such as run on a general purpose computer system or a dedicated machine), or a combination of both. For software-implemented processes, the description of a flow diagram enables one skilled in the art to develop such programs including instructions to carry out the processes on suitably configured computers (the processor of the computer executing the instructions from computer-readable media, including memory). The computer-executable instructions may be written in a computer programming language or may be embodied in firmware logic. If written in a programming language conforming to a recognized standard, such instructions can be executed on a variety of hardware platforms and for interface to a variety of operating systems. In addition, the embodiments of the present invention are not described with reference to any particular programming language. It will be appreciated that a variety of programming languages may be used to implement the teachings described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be appreciated that more or fewer operations may be incorporated into the processes illustrated in FIGS. 2-9 without departing from the scope of the invention and that no particular order is implied by the arrangement of blocks shown and described herein.

Figure 2:
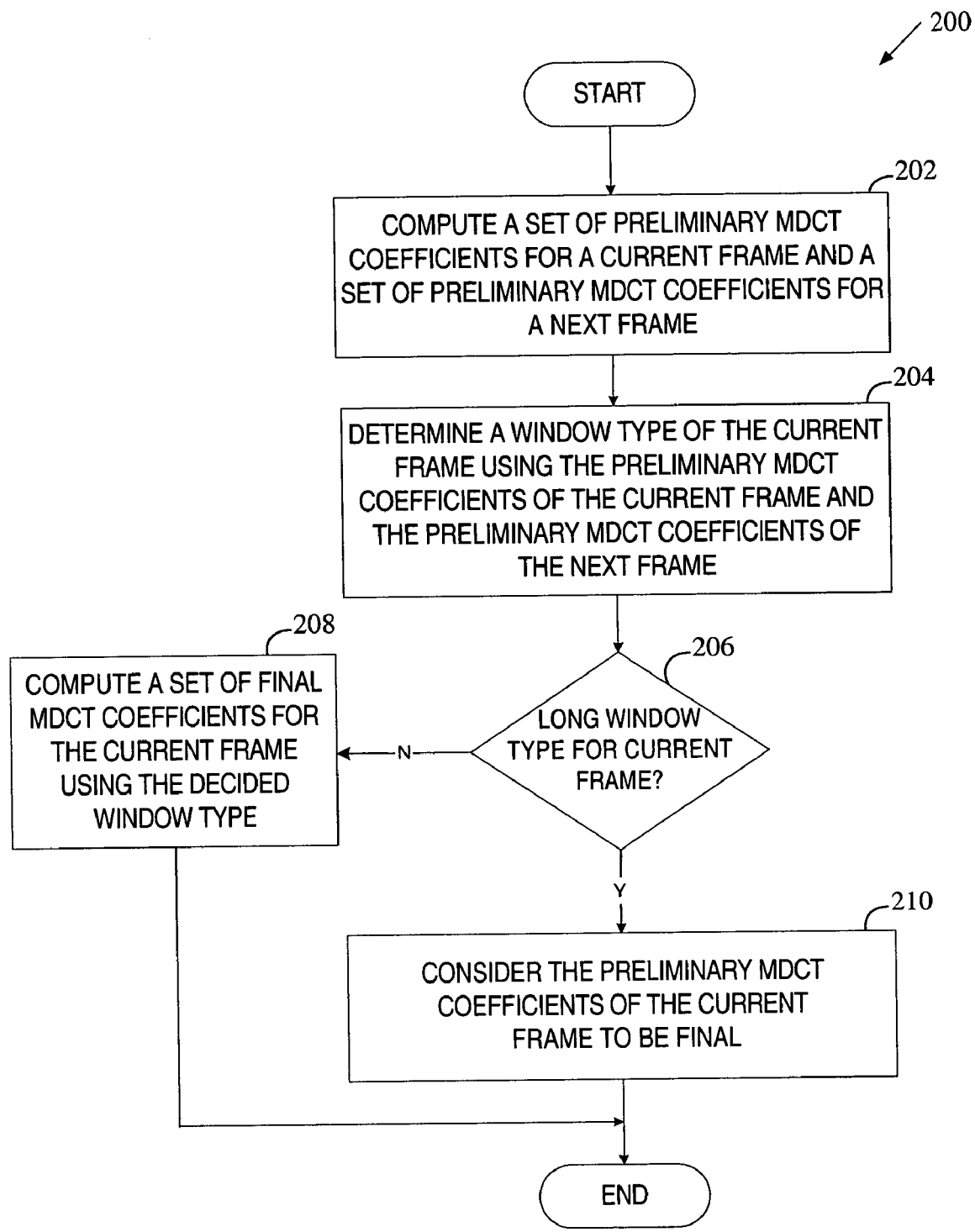
FIG. 2 is a flow diagram of one embodiment of a process for performing MDCT on a frame of spectral data.

FIG. 2 is a flow diagram of one embodiment of a process 200 for performing MDCT on a frame of spectral data.

Referring to FIG. 2, processing logic begins with computing a set of preliminary MDCT coefficients for a current frame and a set of preliminary MDCT coefficients for a next frame (processing block 202). Computations are performed under the assumption that the window type of both the current frame next frame is a long window type. The computed preliminary MDCT coefficients of the current and next frames are stored in a buffer. In one embodiment, the current frame and the next frame are two adjacent frames in a sequence of frames (also know as blocks) of samples which are produced along the time axis such that adjacent frames overlap (e.g., by 50%) with one another. The overlapping suppresses distortion developing at a boundary portion between adjacent frames.

At processing block 204, processing logic determines a window type of the current frame using the preliminary MDCT coefficients of the current frame and the preliminary MDCT coefficients of the next frame. The window type determination is made using a window type decision method that favors the use of long windows. One embodiment of such method will be discussed in greater detail below in conjunction with FIG. 3.

At decision box 206, processing logic determines whether the decided window type of the current frame is the long window type. If not, processing logic computes a set of final MDCT coefficients for the current frame using the decided window type (processing block 208). If so, processing logic considers the preliminary MDCT coefficients of the current frame to be final (processing block 210).

Figure 3:
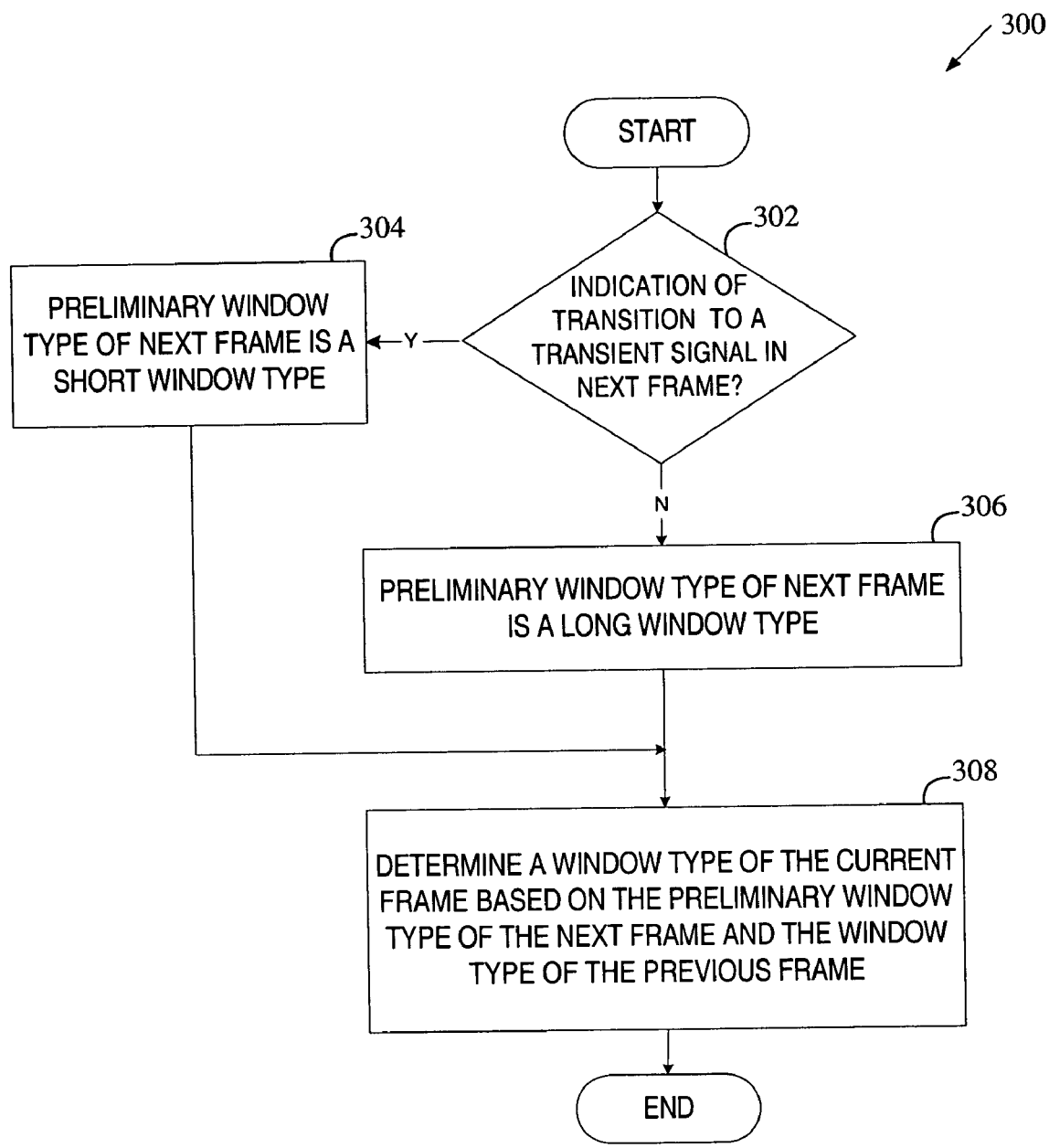
FIG. 3 is a flow diagram of one embodiment of a window type decision process.

FIG. 3 is a flow diagram of one embodiment of a window type decision process 300.

Referring to FIG. 3, processing logic begins with determining whether there is an indication of a transition from a steady signal to a transient signal in the next frame (decision box 302). In one embodiment, this determination is made by comparing the energy associated with the current frame and the energy associated with the next frame. One embodiment of a process for detecting a transition from a steady signal to a transient signal in a frame is discussed in greater detail below in conjunction with FIG. 4.

If the determination made at decision box 302 is positive, processing logic decides that a preliminary window type of the next frame is a short window type (processing block 304). Otherwise, processing logic decides that a preliminary window type of the next frame is a long window type (processing block 306).

Further, processing logic determines a window type of the current frame based on the preliminary window type of the next frame and the window type of a previous frame (processing block 308). The determination of the window type of the current frame favors the use of the long window type. In one embodiment, in which each distinct window type can be followed by two transitional window types as defined by the MPEG standard, processing logic selects a window type that minimizes the use of short windows in the current frame and subsequent frames. That is, the MPEG standard provides for two transitional window types from each distinct window type, with the one transitional window type allowing the use of short windows either in the current frame or the next frame, and the other transitional window type allowing the use of a long window either in the current frame or the next frame. Specifically, the MPEG standard allows the following transitions:

a. from a long window type to either a long window type or a long-short window type;

b. from a long-short window type to either a short window type or a short-long window type;

c. from a short-long window type to either a long window type or a long-short window type; and d. from a short window type to either a short window type or a short-long window type.

Hence, if the window type of the previous frame is, for example, a short-long window type and the preliminary window type of the next frame is a long window type, processing logic selects a long window type for the current frame, rather than the other option of a long-short window type which would facilitate the use of short windows in the next frame.

One embodiment of a process for determining a window type of a current frame based on a preliminary window type of the next frame and the window type of the previous frame will be discussed in more detail below in conjunction with FIG. 5.

The window type decision method described above is combined with MDCT computations, operates directly on MDCT data and does not require the Fast Fourier Transform (FFT) operation and computation of perceptual entropy. In addition, the window type decision method described above favors the use of long windows, thus minimizing the use of short windows. It uses short windows only if an indication of a transition from a steady signal to a transient signal is detected.

Figure 4:
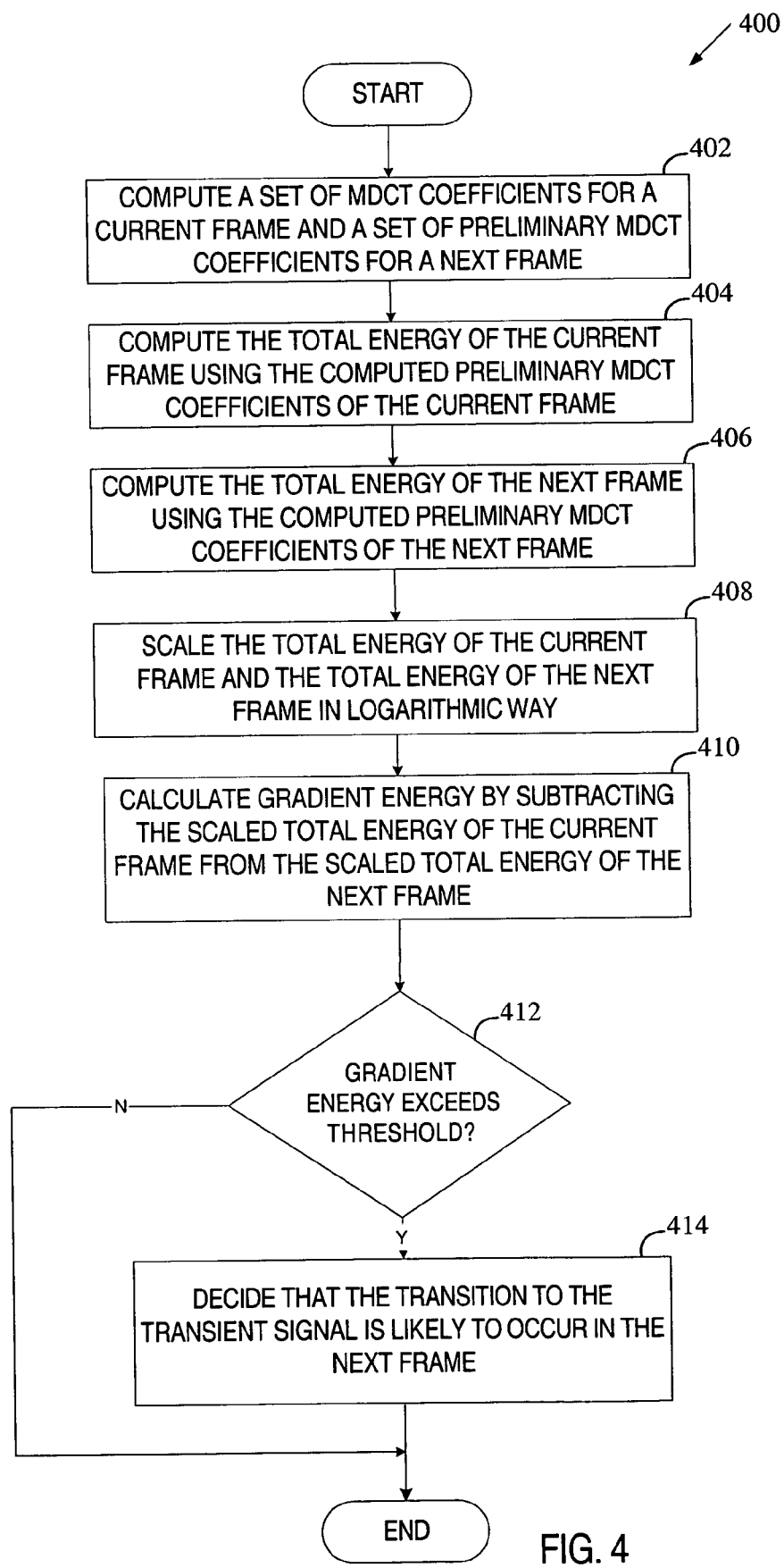
FIG. 4 is a flow diagram of one embodiment of a process for detecting an indication of a transition from a steady signal to a transient signal in a frame.

FIG. 4 is a flow diagram of one embodiment of a process 400 for detecting an indication of a transition from a steady signal to a transient signal in a frame.

Referring to FIG. 4, processing logic begins with computing a set of MDCT coefficients for a current frame and a set of preliminary MDCT coefficients for a next frame (processing block 402). Processing logic then stores the computed sets of MDCT coefficients in a buffer.

At processing block 404, processing logic computes the total energy of the current frame using the computed preliminary MDCT coefficients of the current frame. In one embodiment, the total energy of the current frame is computed as $$\text{current\_total\_energy}=\text{sum}(\text{current\_coef}[i]*\text{current\_coef}[i]/C) \text{ for } i=0 \text{ to } 1023,$$

wherein current_coef[i] is a value of an i-th MDCT coefficient in the current frame, and C is a constant used to prevent the overflow of summation (e.g., C=32767 for a 16-bit register).

At processing block 406, processing logic computes the total energy of the next frame using the computed preliminary MDCT coefficients of the next frame. Similarly, the total energy of the next frame is computed as $$\text{next\_total\_energy}=\text{sum}(\text{next\_coef}[i]*\text{next\_coef}[i]/C) \text{ for } i=0 \text{ to } 1023,$$

wherein next_coef[i] is a value of an i-th MDCT coefficient in the next frame, and C is a constant used to prevent the overflow of summation.

At processing block 408, processing logic scales the total energy of the current frame and the total energy of the next frame in logarithmic way. In one embodiment, the scaling is done as $$c\_\text{pow}=\log(\text{current\_total\_energy}) \text{ and } n\_\text{pow}=\log(\text{next\_total\_energy}).$$

At processing block 410, processing logic calculates gradient energy by subtracting the scaled total energy of the current frame from the scaled total energy of the next frame.

At decision box 412, processing logic determines whether the gradient energy exceeds a threshold value (e.g., 1). In one embodiment the threshold value is experimentally defined. If the determination made at decision box 412 is positive, processing logic decides that the transition to the transient signal is likely to occur in the next frame (processing block 414).

Figure 5:
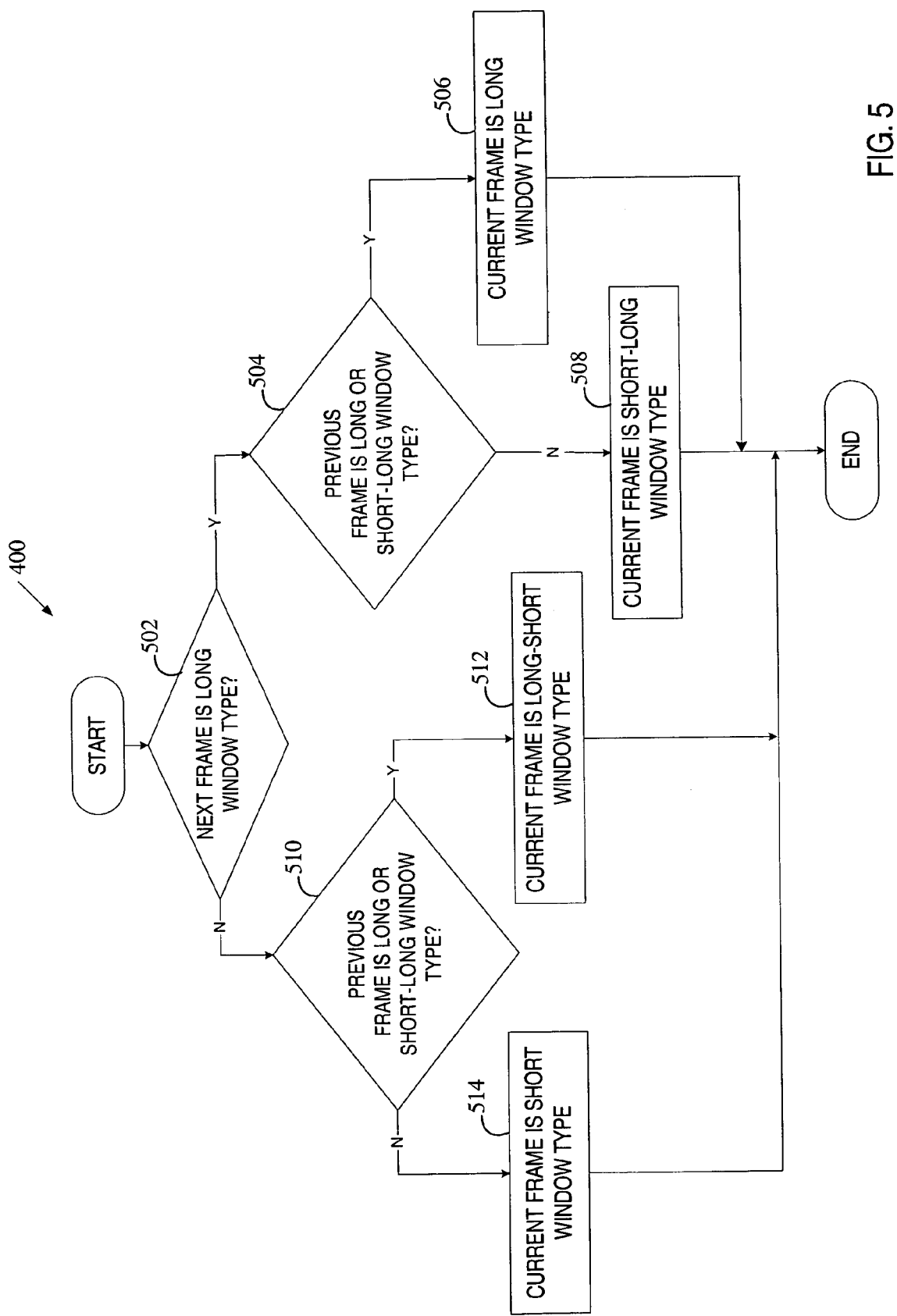
FIG. 5 is a flow diagram of one embodiment of a process for determining a window type of a current frame based on a preliminary window type of a next frame and the window type of a previous frame.

FIG. 5 is a flow diagram of one embodiment of a process 500 for determining a window type of a current frame based on a preliminary window type of a next frame and the window type of a previous frame.

Referring to FIG. 5, processing logic begins with determining whether the preliminary window type of the next frame is a long window type (decision box 502). If so, processing logic further determines whether the window type of the previous frame is either a long window type or short-long window type (decision box 504). If so, processing logic decides that the window type of the current frame is a long window type (processing block 506). If not, processing logic decides that the window type of the current frame is a short-long window type (processing block 508).

If the determination made at decision box 502 is negative, i.e., the preliminary window type of the next frame is a short window type, processing logic further determines whether the window type of the previous frame is either a long window type or short-long window type (decision box 510). If so, processing logic decides that the window type of the current frame is a long-short window type (processing block 512). If not, processing logic decides that the window type of the current frame is a short window type (processing block 514).

In one embodiment, if a decision is made to use the short window type for a frame, short window grouping is used to reduce the amount of side information associated with short windows. Each group includes one or more successive short windows, the scalefactor for which is the same. In one embodiment, the information about grouping is contained in a designated bitstream element. In one embodiment, the information about grouping includes the number of groups within a frame and the number of short windows in each frame.

Figure 6:
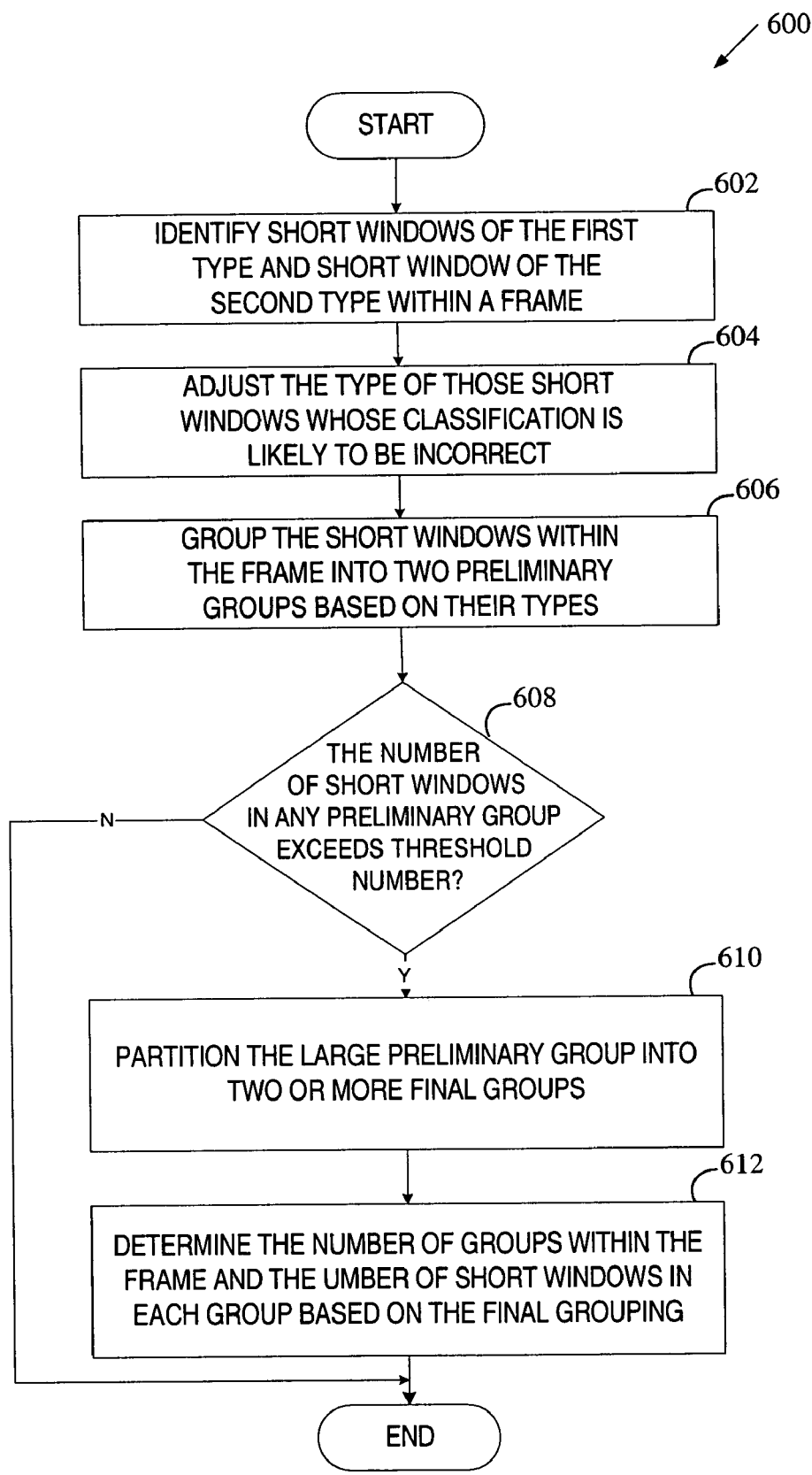
FIG. 6 is a flow diagram of one embodiment of a process for grouping short windows within a frame.

FIG. 6 is a flow diagram of one embodiment of a process 600 for grouping short windows within a frame.

Referring to FIG. 6, processing logic begins with identifying short windows of the first type and short windows of the second type within a frame (processing block 602). The type of a short window is determined based on the energy associated with this window. One embodiment of a process for determining the type of a short window will be discussed in more detail below in conjunction with FIG. 7.

At processing block 604, processing logic adjusts the type of the short windows whose classification is likely to be incorrect. In one embodiment, the classification of a short window is likely to be incorrect if its type does not match the type of the adjacent windows and the adjacent windows are of the same type. In one embodiment, in which the number of short windows within a frame is equal to 8, the adjustment process can be expressed as follows:

```
for win_index 1 to 6
    if (candidate[win_index-1] = candidate [win_index+1])
        candidate[win_ndex] = candidate[win_index-1],
``` wherein win_index points to the number of a short window within the frame, and candidate[win_index], candidate[win_index-1] and candidate[win_index+1] indicate types of a current window, a previous window, and a next window respectively.

At processing block 606, processing logic groups the short windows within the frame into two preliminary groups based on their types. One embodiment of a process for creating two preliminary groups of short windows will be discussed in more detail below in conjunction with FIG. 8.

At decision box 608, processing logic determines whether the number of short windows in any preliminary group exceeds a threshold number. In one embodiment, the threshold number is a constant that was experimentally determined. Depending on the threshold number, none, one or both preliminary groups may be too large. In another embodiment, the threshold number is the number of short windows in the other preliminary group, and processing logic decides that the number of short windows in one preliminary group exceeds a threshold if it exceeds the number of short windows in the other preliminary group. When the comparison is used, none or one preliminary group may be too large. When a group is too large, it is likely that it combines short windows with different characteristics. Then, the use of a common scale factor for this group may cause degradation in the sound quality.

If processing logic determines at decision box 608 that any of the two preliminary groups is too large, processing logic further partitions the large preliminary group into two or more final groups (processing block 610). The final grouping is done in such a way as to have a group number that enables a balance between the coding efficiency and the sound quality. One embodiment of a process for performing a final grouping of short windows will be described in more detail below in conjunction with FIG. 9.

At processing block 612, processing logic determines the number of groups within the frame and the number of short windows in each group based on the final grouping.

Figure 7:
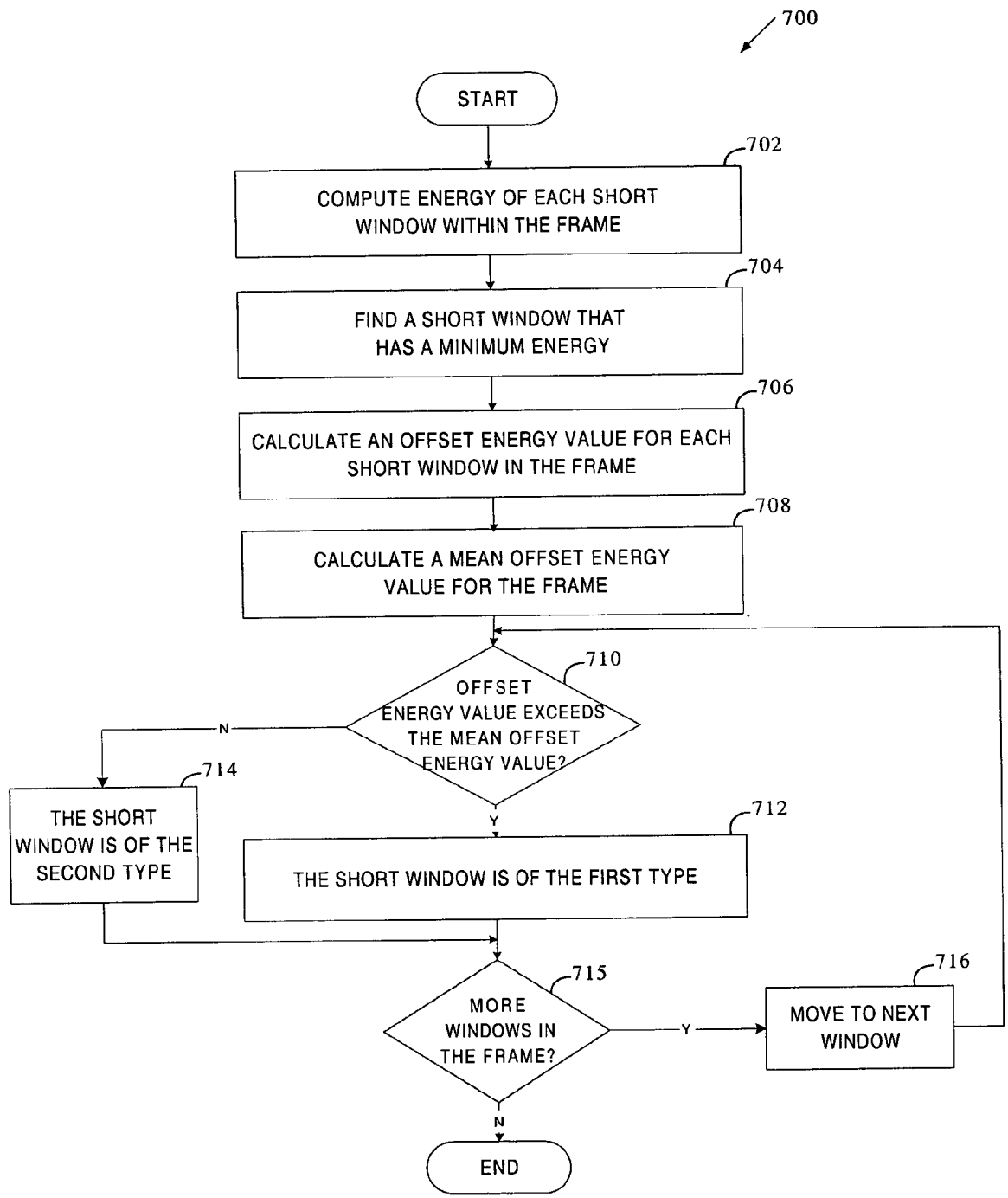
FIG. 7 is a flow diagram of one embodiment of a process for determining the type of a short window.

FIG. 7 is a flow diagram of one embodiment of a process 700 for determining the type of a short window.

Referring to FIG. 7, processing logic begins with computing energy of each short window within the frame (processing block 702). In one embodiment, the energy of each short window is computed as $$\text{win\_energy}[\text{win\_index}] = \log[\text{sum}(\text{coef}[i]*\text{coef}[i]) + 0.5],$$

wherein [win_index] identifies the number of a current short window within the frame, win_energy is the resulting energy, and coef[i] is an i-th spectral coefficient within the short window.

Next, processing logic finds a short window that has minimum energy (processing block 704) and calculates an offset energy value for each short window in the frame (processing block 706). In one embodiment, an offset energy value is calculated by subtracting the minimum energy from the energy of a corresponding short window.

At processing block 708, processing logic calculates a mean offset energy value for the frame by dividing the sum all the offset energy values within the frame by the number of short windows in the frame.

At decision box 710, processing logic determines for a first short window whether its offset energy value exceeds the mean offset energy value. If so, processing logic decides that the short window is of the first type (processing block 712). If not, processing logic decides that the short window is of the second type (processing block 714).

Next, processing logic determines whether there are more unprocessed windows in the frame (decision box 715). If so, processing logic moves to the next short window (processing block 716) and proceeds to decision box 710. If not, process 700 ends.

Figure 8:
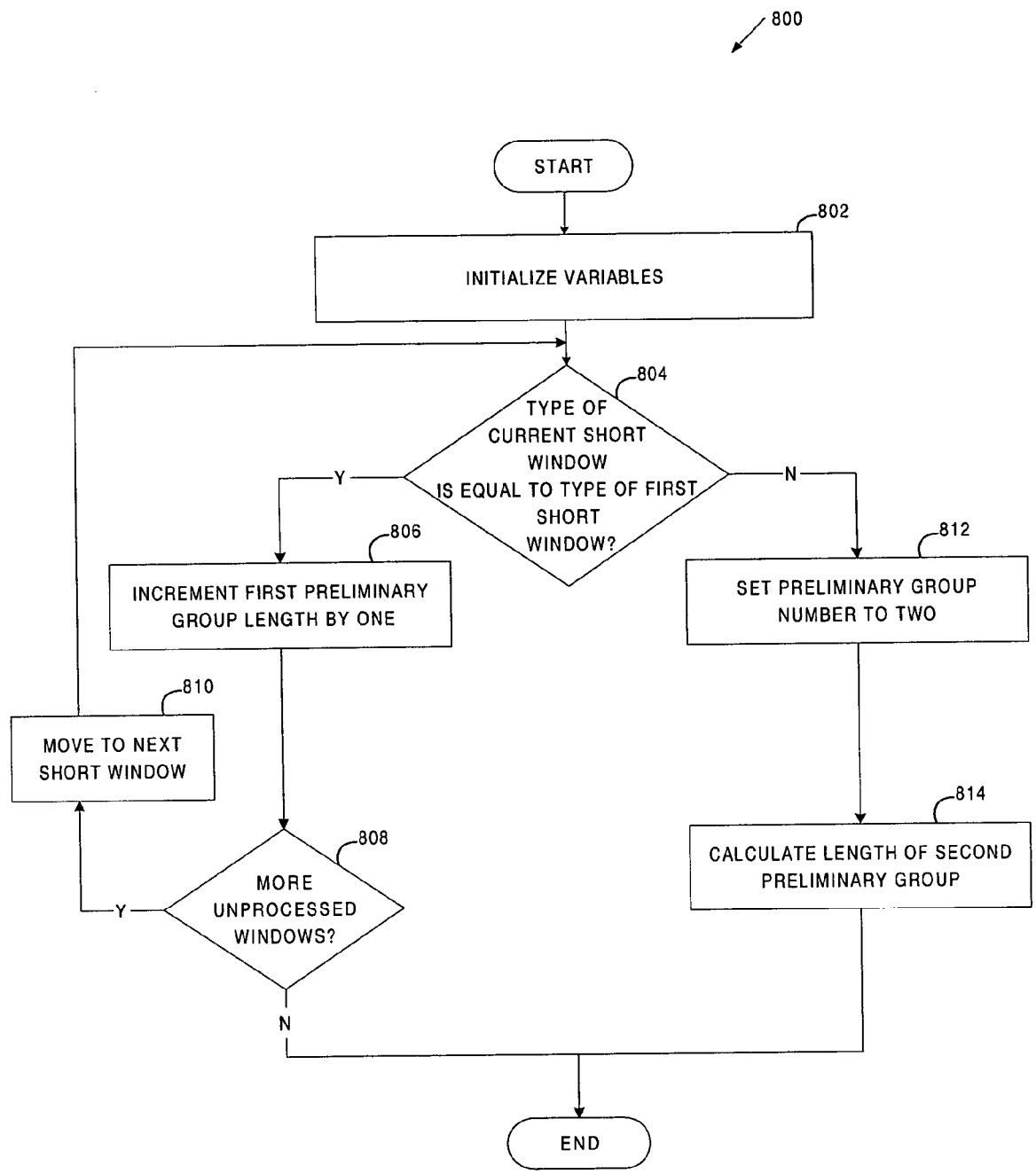
FIG. 8 is a flow diagram of one embodiment of a process for creating two preliminary groups of short windows.

FIG. 8 is a flow diagram of one embodiment of a process 800 for creating two preliminary groups of short windows.

Referring to FIG. 8, processing logic begins with initializing a set of variables (processing block 802). For example, processing logic may set the value of a previous window type variable to the type of a first short window, the value of a preliminary group number variable to 1, and the value of a first preliminary group length variable to 1.

Next, processing logic starts processing the short windows, beginning with the second short window in the frame. Specifically, processing logic determines whether the type of the current short window is the same as the type of the first short window (decision box 804). If so, processing logic increments the first preliminary group length by 1 (processing block 806), and checks whether more short windows remain unprocessed (decision box 808). If more short windows remain unprocessed, processing logic moves to the next short window (processing block 810) and returns to decision box 804. If no more short windows remain unprocessed, process 800 ends.

If processing logic determines at decision box 804 that the type of the current short window is not the same as the type of the first short window, processing logic sets the preliminary group number to 2 (processing block 812) and calculates the length of the second preliminary group by subtracting the length of the first preliminary group from the total number of short frames (e.g., 8) (processing block 814).

Figure 9:
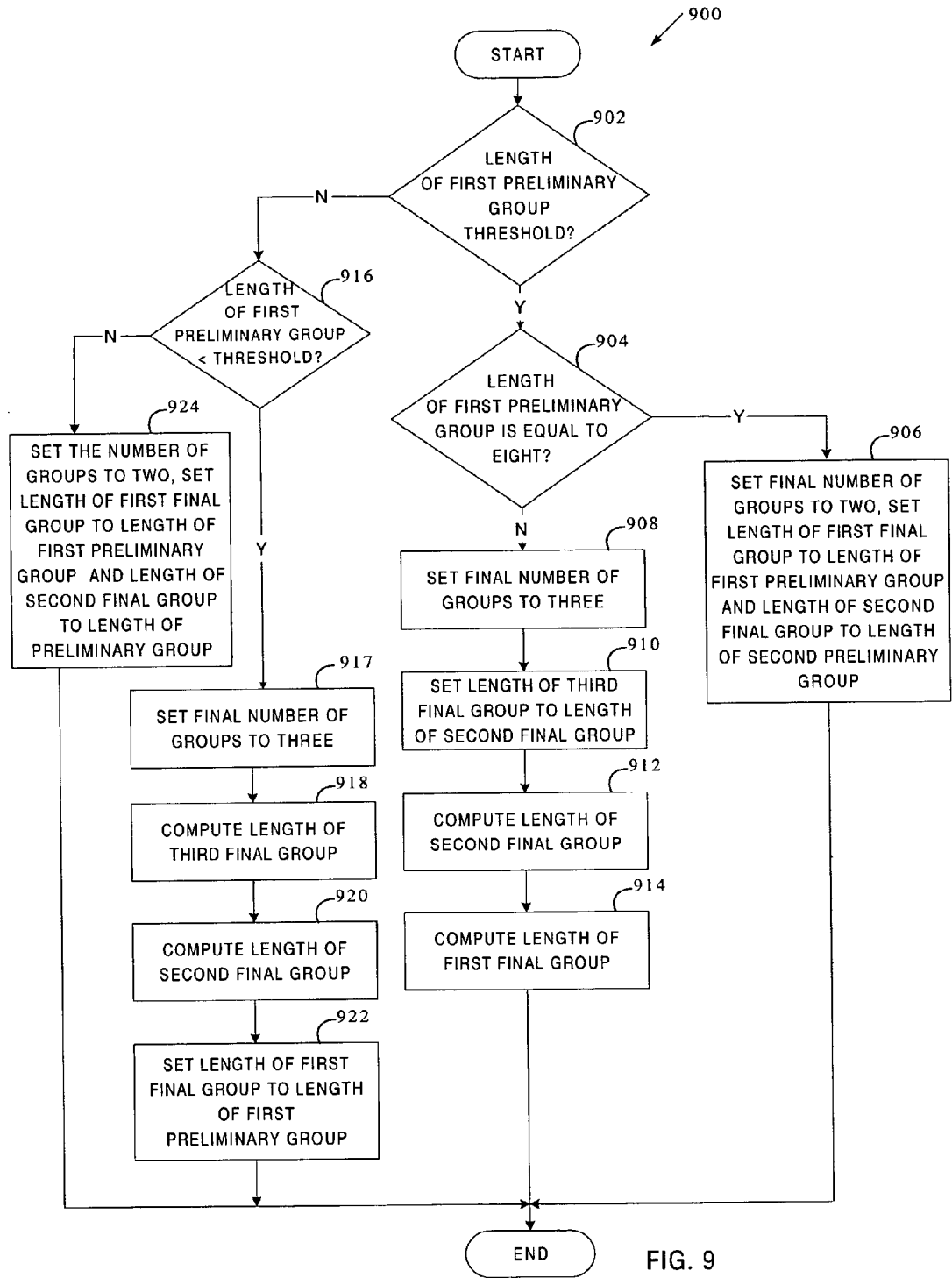
FIG. 9 is a flow diagram of one embodiment of a process for performing a final grouping of short windows.

FIG. 9 is a flow diagram of one embodiment of a process 900 for performing a final grouping of short windows. Process 900 operates in accordance with the MPEG standard, according to which the number of short windows in the frame is equal to 8.

Referring to FIG. 9, processing logic begins with deciding whether the length of a first preliminary group exceeds a threshold (e.g., 4) (decision box 902). If so, processing logic further determines whether the length of the first preliminary group is equal to 8 (decision box 904). If so, processing logic sets the final number of groups to 2, sets the length of the first final group to the length of the first preliminary group, and sets the length of the second final group to the length of the second preliminary group (processing block 906). If not, processing logic sets the final number of groups to 3 (processing block 908), sets the length of a third final group to the length of the second preliminary group (processing block 910), computes the length of a second final group by dividing the length of the preliminary second group by two (the computation can be expressed as window_group_length[1]>>1) (processing block 912), and computes the length of a first final group by subtracting the length of the second final group from the length of the first preliminary group (processing block 914).

If processing logic determines at decision box 902 that the length of the first preliminary group does not exceed the threshold, it further determines whether the length of the first preliminary group is below the threshold (decision box 916). If so, processing logic sets the final number of groups to 3 (processing block 917), computes the length of a third final group by dividing the length of the second preliminary group by two (the computation can be expressed as window_group_length[2]>>1) (processing block 918), computes the length of a second final group by subtracting the length of the third final group from the length of the second preliminary group (processing block 920), and sets the length of the first final group to the length of the first preliminary group (processing block 922).

If processing logic determines at decision box 916 that the length of the first preliminary group is not below the threshold, it sets the number of groups to 2 and sets the length of the first final group to the length of the first preliminary group and the length of the second final group to the length of the second preliminary group (processing block 924).

Figure 10:
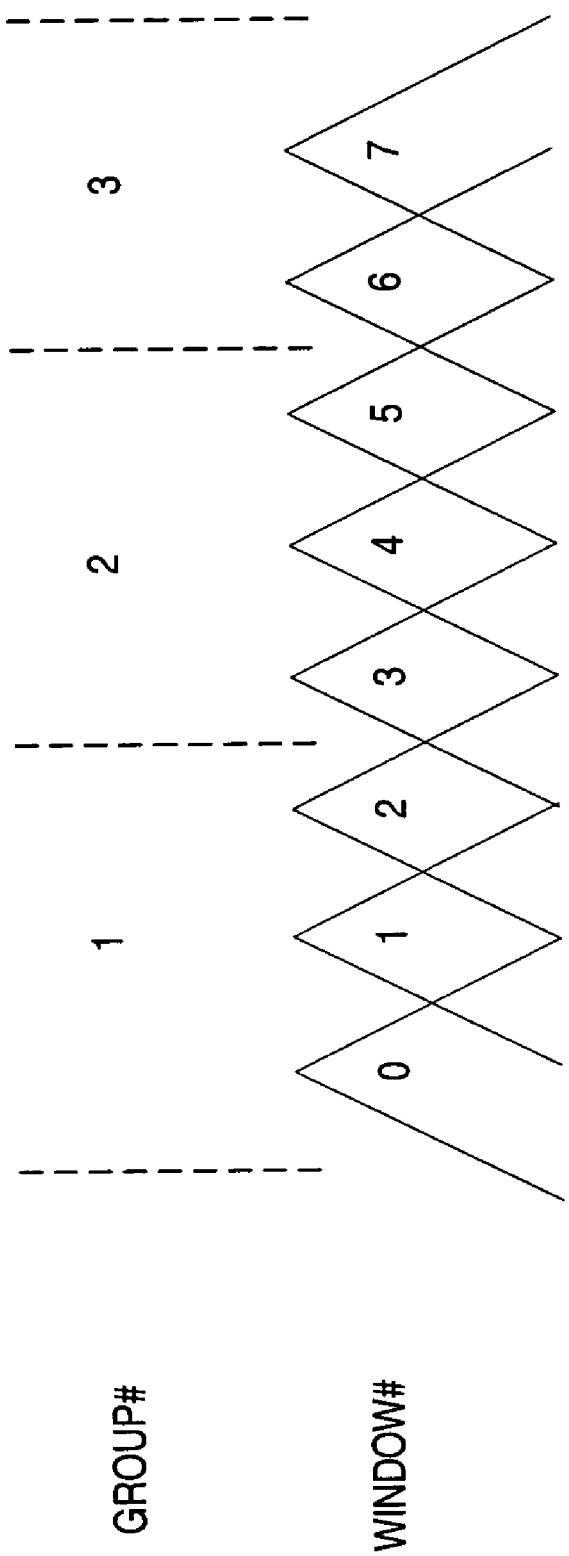
FIG. 10 illustrates an exemplary grouping of short windows of a frame.

FIG. 10 illustrates an exemplary grouping of short windows of a frame.

Referring to FIG. 10, the types of short windows being grouped are shown by grouping_bits "11100011". The types of short windows may be determined by process 700 of FIG. 7. Based on these types of short windows, the short windows may be first grouped into two preliminary groups using process 800 of FIG. 8, thus creating a first preliminary group with 3 short windows and a second preliminary group with 5 short windows. Next, process 900 of FIG. 9 may be performed using a threshold number of 4 to further partition the second preliminary group into two groups. As a result, three final groups are created, with the first final group having 3 short windows, the second final group having 3 short windows and the third final group having 2 short windows.

Figure 11:
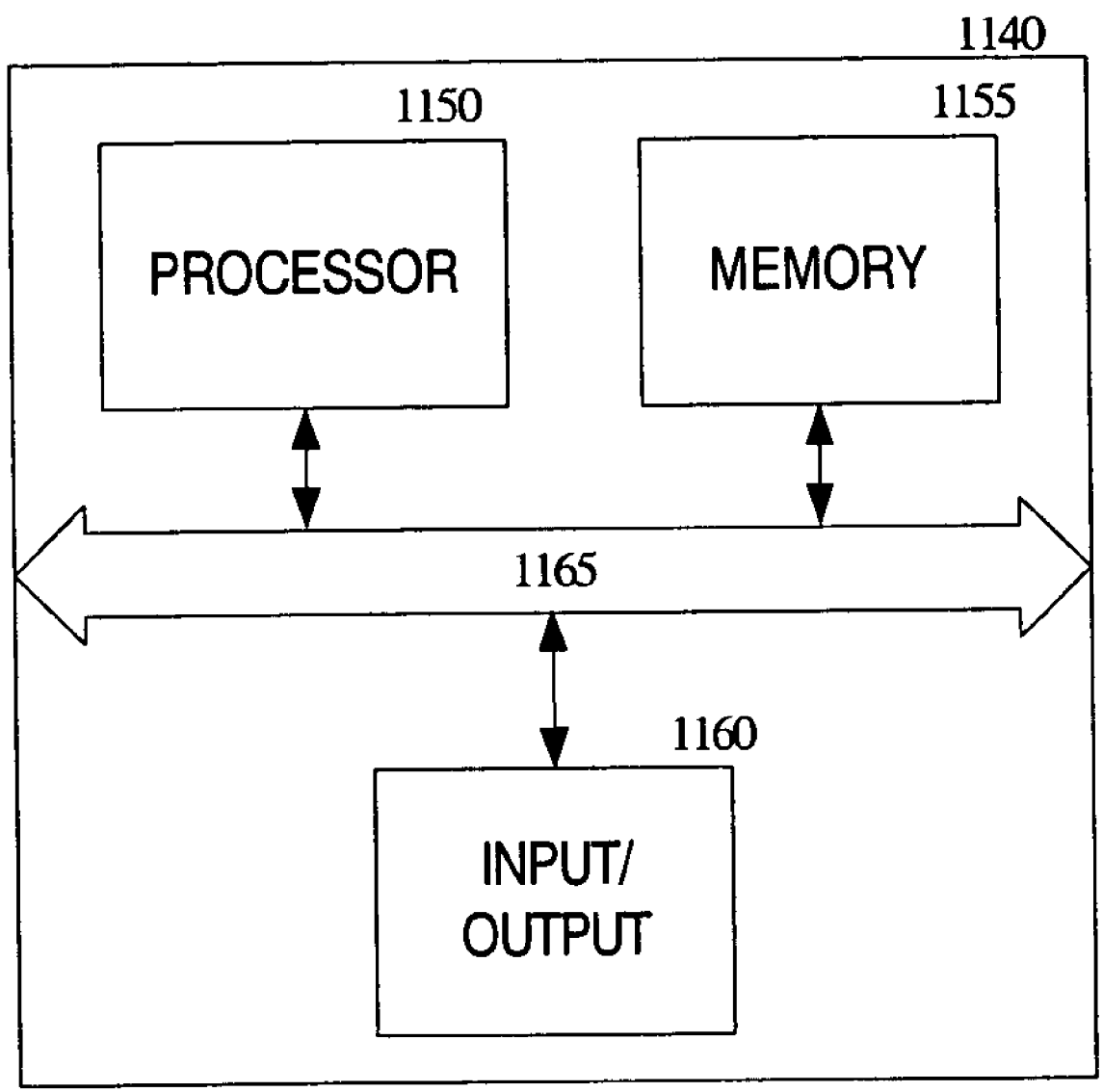
FIG. 11 is a block diagram of a computer environment suitable for practicing embodiments of the present invention.

The following description of FIG. 11 is intended to provide an overview of computer hardware and other operating components suitable for implementing the invention, but is not intended to limit the applicable environments. FIG. 11 illustrates one embodiment of a computer system suitable for use as an encoding system 100 or just a filterbank module 102 of FIG. 1.

The computer system 1140 includes a processor 1150, memory 1155 and input/output capability 1160 coupled to a system bus 1165. The memory 1155 is configured to store instructions which, when executed by the processor 1150, perform the methods described herein. Input/output 1160 also encompasses various types of computer-readable media, including any type of storage device that is accessible by the processor 1150. One of skill in the art will immediately recognize that the term "computer-readable medium/media" further encompasses a carrier wave that encodes a data signal. It will also be appreciated that the system 1140 is controlled by operating system software executing in memory 1155. Input/output and related media 1160 store the computer-executable instructions for the operating system and methods of the present invention. The filterbank module 102 shown in FIG. 1 may be a separate component coupled to the processor 1150, or may be embodied in computer-executable instructions executed by the processor 1150. In one embodiment, the computer system 1140 may be part of, or coupled to, an ISP (Internet Service Provider) through input/output 1160 to transmit or receive image data over the Internet. It is readily apparent that the present invention is not limited to Internet access and Internet web-based sites; directly coupled and private networks are also contemplated.

It will be appreciated that the computer system 1140 is one example of many possible computer systems that have different architectures. A typical computer system will usually include at least a processor, memory, and a bus coupling the memory to the processor. One of skill in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

Various aspects of making a window type decision in audio encoding have been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

What is claimed is:

1. A method of execution by a computer, the method comprising:
    detecting an indication of a transition from a steady signal to a transient signal in a next frame of audio data;
    deciding that a preliminary window type of the next frame is a short window type; and
    determining a window type of a current frame of data based on the preliminary window type of the current frame and a window type of a previous frame of data, the determination of the window type of the current frame favoring use of a long window type over use of the short window type, wherein the audio data is transformed into a frequency domain using a transformation range defined by the window type.

2. The method of claim 1 wherein detecting an indication of a transition comprises:
    computing a plurality of Modified Discrete Cosine Transform (MDCT) coefficients for a current frame of data and a plurality of preliminary MDCT coefficients for a next frame of data using a long window type for each of the current frame and the next frame;
    computing a total energy of the current frame using the plurality of preliminary MDCT coefficients of the current frame;
    computing a total energy of the next frame using the plurality of preliminary MDCT coefficients of the next frame;
    scaling the total energy of the current frame and the total energy of the next frame in logarithmic way;
    calculating a gradient energy by subtracting the scaled total energy of the current frame from the scaled total energy of the next frame;
    determining whether the gradient energy exceeds a threshold value; and
    if the gradient energy exceeds the threshold value, deciding that the transition to the transient signal is likely to occur in the next frame.

3. The method of claim 2 wherein the plurality of preliminary MDCT coefficients is computed from a plurality of corresponding samples produced along the time axis.

4. The method of claim 2 wherein the threshold value is experimentally determined.

5. The method of claim 2 further comprising:
    if the gradient energy does not exceed the threshold value,
        deciding that the transition to the transient signal does not occur in the next frame, and
        deciding that the preliminary window type of the next frame is a long window type.

6. The method of claim 1 wherein determining a window type of a current frame of data based on the preliminary window type of the next frame and a window type of a previous frame of data comprises:
    identifying the window type of the previous frame; and
    selecting a window type for the current frame to transition from the window type of the previous frame to the preliminary window type of the next frame, the selection favoring the use of the long window type over the use of the short window type.

7. The method of claim 6 wherein selecting a window type for the current frame comprises:
    selecting a long window type for the current frame if the preliminary window type of the next frame is a long window type and the window type of the previous frame is any one of a long window type and a short-long window type.

8. The method of claim 6 wherein selecting a window type for the current frame comprises:
    selecting a short-long window type for the current frame if the preliminary window type of the next frame is a long window type and the window type of the previous frame is any one of a short window type and a long-short window type.

9. The method of claim 6 wherein selecting a window type for the current frame comprises:
    selecting a long-short window type for the current frame if the preliminary window type of the next frame is a short window type and the window type of the previous frame is any one of a long window type and a short-long window type.

10. The method of claim 6 wherein selecting a window type for the current frame comprises:

selecting a short window type for the current frame if the preliminary window type of the next frame is a short window type and the window type of the previous frame is any one of a short window type and a long-short window type.

11. A computer readable medium that provides instructions, which when executed on a processor cause the processor to perform a method comprising:
   detecting an indication of a transition from a steady signal to a transient signal in a next frame of data; and
   deciding that a preliminary window type of the next frame is a short window type; and
   determining a window type of a current frame of data based on the preliminary window type of the current frame and a window type of a previous frame of data, the determination of the window type of the current frame favoring use of a long window type over use of the short window type.

12. The computer readable medium of claim 11 wherein the plurality of preliminary MDCT coefficients is computed from a plurality of corresponding samples produced along the time axis.

13. The computer readable medium of claim 11 wherein the method further comprises:
   if the determined window type of the current frame is the long window type, using the plurality of preliminary MDCT coefficients of the current frame as the plurality of final MDCT coefficients of the current frame.

14. A computerized system comprising:
   a memory; and
   at least one processor coupled to the memory, the at least one processor executing a set of instructions which cause the at least one processor to
   detect an indication of a transition from a steady signal to a transient signal in a next frame of data,
   decide that a preliminary window type of the next frame is a short window type, and
   determine a window type of a current frame of data based on the preliminary window type of the current frame and a window type of a previous frame of data, the determination of the window type of the current frame favoring use of a long window type over use of the short window type.

15. The system of claim 14 wherein the plurality of preliminary MDCT coefficients is computed from a plurality of corresponding samples produced along the time axis.

16. The system of claim 14 wherein the processor is further to use the plurality of preliminary MDCT coefficients of the current frame as the plurality of final MDCT coefficients of the current frame if the determined window type of the current frame is the long window type.

17. An apparatus comprising:
   means for detecting an indication of a transition from a steady signal to a transient signal in a next frame of audio data; and
   means for deciding that a preliminary window type of the next frame is a short window type; and
   means for determining a window type of a current frame of data based on the preliminary window type of the current frame and a window type of a previous frame of data, the determination of the window type of the current frame favoring use of a long window type over use of the short window type, wherein the audio data is transformed into a frequency domain using a transformation range defined by the window type.

* * * * *